US010633979B2

(12) United States Patent
Dutta et al.

(10) Patent No.: US 10,633,979 B2
(45) Date of Patent: Apr. 28, 2020

(54) TURBOMACHINE ROTOR BLADE POCKET

(71) Applicant: General Electric Company, Schenectady, NY (US)

(72) Inventors: Sandip Dutta, Greenville, SC (US); Gary Michael Itzel, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 288 days.

(21) Appl. No.: 15/603,785

(22) Filed: May 24, 2017

(65) Prior Publication Data
US 2018/0340427 A1 Nov. 29, 2018

(51) Int. Cl.
*F01D 25/12* (2006.01)
*F01D 5/18* (2006.01)

(52) U.S. Cl.
CPC .......... *F01D 5/187* (2013.01); *F05D 2220/32* (2013.01); *F05D 2260/231* (2013.01)

(58) Field of Classification Search
CPC .......... F01D 5/187; F01D 5/186; F01D 25/12; F05D 2220/32

USPC ................. 416/174, 95; 415/170.1, 175, 230
See application file for complete search history.

(56) References Cited

U.S. PATENT DOCUMENTS

| 6,811,378 | B2 | 11/2004 | Kraft | |
|---|---|---|---|---|
| 9,086,017 | B2 | 7/2015 | Twardochleb et al. | |
| 2006/0130994 | A1* | 6/2006 | Grunstra | B22C 9/103 164/369 |
| 2016/0273365 | A1* | 9/2016 | Slavens | F01D 5/186 |
| 2017/0204731 | A1* | 7/2017 | Devore | F01D 5/189 |
| 2018/0156049 | A1* | 6/2018 | Clum | F01D 9/041 |

* cited by examiner

*Primary Examiner* — Hai H Huynh
*Assistant Examiner* — Gonzalo Laguarda
(74) *Attorney, Agent, or Firm* — Dority & Manning, P.A.

(57) ABSTRACT

The present disclosure is directed to a rotor blade for a turbomachine. The rotor blade includes an airfoil defining a cooling passage extending between a root and a tip of the airfoil. The airfoil further defines a pocket positioned between the cooling passage and an exterior surface of the airfoil and spaced apart from the cooling passage and the exterior surface. The pocket provides a thermal impediment between the cooling passage and the exterior surface of the airfoil.

18 Claims, 4 Drawing Sheets

TURBOMACHINE ROTOR BLADE POCKET

FIELD

The present disclosure generally relates to turbomachines. More particularly, the present disclosure relates to pockets in rotor blades for turbomachines.

BACKGROUND

A gas turbine engine generally includes a compressor section, a combustion section, and a turbine section. The compressor section progressively increases the pressure of air entering the gas turbine engine and supplies this compressed air to the combustion section. The compressed air and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected to a generator to produce electricity.

The turbine section generally includes a plurality of rotor blades, which extract kinetic energy and/or thermal energy from the combustion gases flowing through the turbine section. In this respect, each rotor blade includes an airfoil positioned within the flow of the combustion gases. Since the airfoils operate in a high temperature environment, it may be necessary to cool the rotor blades.

In certain configurations, cooling air is routed through one or more cooling passages defined by the rotor blade to provide cooling thereto. Typically, this cooling air is compressed air bled from the compressor section. Bleeding air from the compressor section, however, reduces the volume of compressed air available for combustion, thereby reducing the efficiency of the gas turbine engine.

BRIEF DESCRIPTION

Aspects and advantages of the technology will be set forth in part in the following description, or may be obvious from the description, or may be learned through practice of the technology.

In one embodiment, the present disclosure is directed to a rotor blade for a turbomachine. The rotor blade includes an airfoil defining a cooling passage extending between a root and a tip of the airfoil. The airfoil further defines a pocket positioned between the cooling passage and an exterior surface of the airfoil and spaced apart from the cooling passage and the exterior surface. The pocket provides a thermal impediment between the cooling passage and the exterior surface of the airfoil.

In another embodiment, the present disclosure is directed to a turbomachine including a turbine section having a plurality of rotor blades. Each rotor blade includes an airfoil defining a cooling passage extending between a root and a tip of the airfoil. The airfoil further defines a pocket positioned between the cooling passage and an exterior surface of the airfoil and spaced apart from the cooling passage and the exterior surface. The pocket provides a thermal impediment between the cooling passage and the outer surface of the airfoil.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
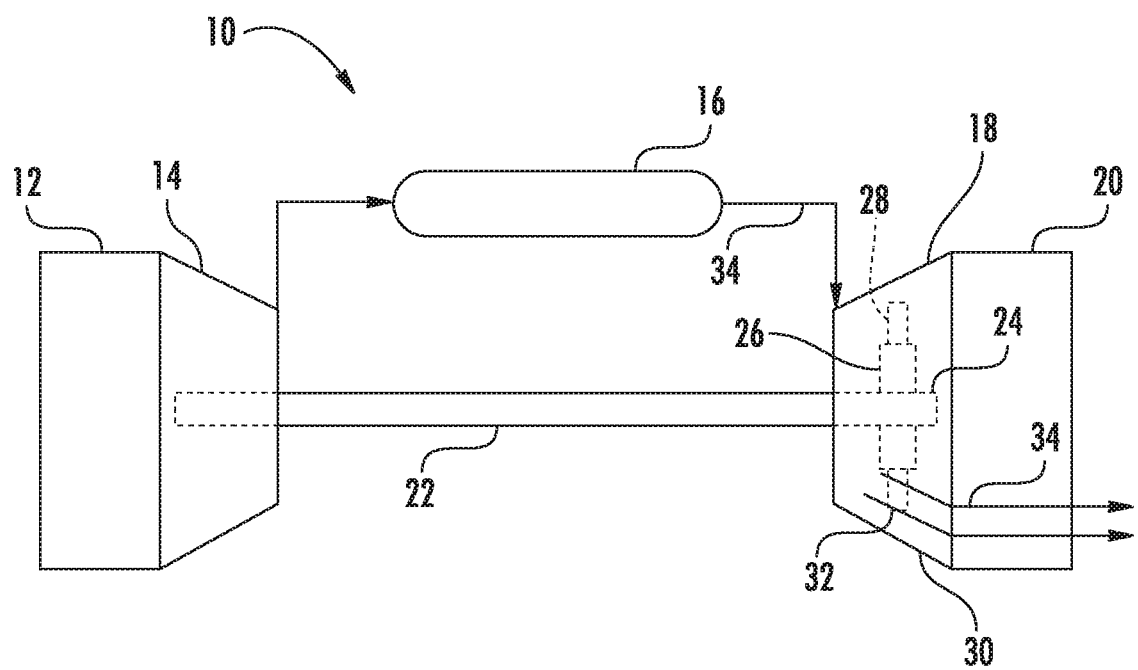
FIG. 1 is a schematic view of an exemplary gas turbine engine in accordance with the embodiments disclosed herein.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Although an industrial or land-based gas turbine is shown and described herein, the present technology as shown and described herein is not limited to a land-based and/or industrial gas turbine unless otherwise specified in the claims. For example, the technology as described herein may be used in any type of turbomachine including, but not limited to, aviation gas turbines (e.g., turbofans, etc.), steam turbines, and marine gas turbines.

Referring now to the drawings, wherein identical numerals indicate the same elements throughout the figures, FIG. 1 schematically illustrates a gas turbine engine 10. The gas turbine engine 10 may include an inlet section 12, a compressor section 14, a combustion section 16, a turbine section 18, and an exhaust section 20. The compressor section 14 and turbine section 18 may be coupled by a shaft 22. The shaft 22 may be a single shaft or a plurality of shaft segments coupled together to form the shaft 22.

The turbine section 18 may generally include a rotor shaft 24, a plurality of rotor disks 26 (one of which is shown), and a plurality of rotor blades 28. More specifically, the plurality of rotor blades 28 may extend radially outward from and interconnect with one of the rotor disks 26. Each rotor disk 26, in turn, may couple to a portion of the rotor shaft 24 that extends through the turbine section 18. The turbine section 18 further includes an outer casing 30 that circumferentially surrounds the rotor shaft 24 and the rotor blades 28, thereby at least partially defining a hot gas path 32 through the turbine section 18.

During operation, air or another working fluid flows through the inlet section 12 and into the compressor section 14, where the air is progressively compressed to provide pressurized air to the combustors (not shown) in the combustion section 16. The pressurized air mixes with fuel and burns within each combustor to produce combustion gases 34. The combustion gases 34 flow along the hot gas path 32 from the combustion section 16 into the turbine section 18. In the turbine section 18, the rotor blades 28 extract kinetic and/or thermal energy from the combustion gases 34, thereby causing the rotor shaft 24 to rotate. The mechanical rotational energy of the rotor shaft 24 may then be used to power the compressor section 14 and/or to generate electricity. The combustion gases 34 exiting the turbine section 18 may then be exhausted from the gas turbine engine 10 via the exhaust section 20.

Figure 2:
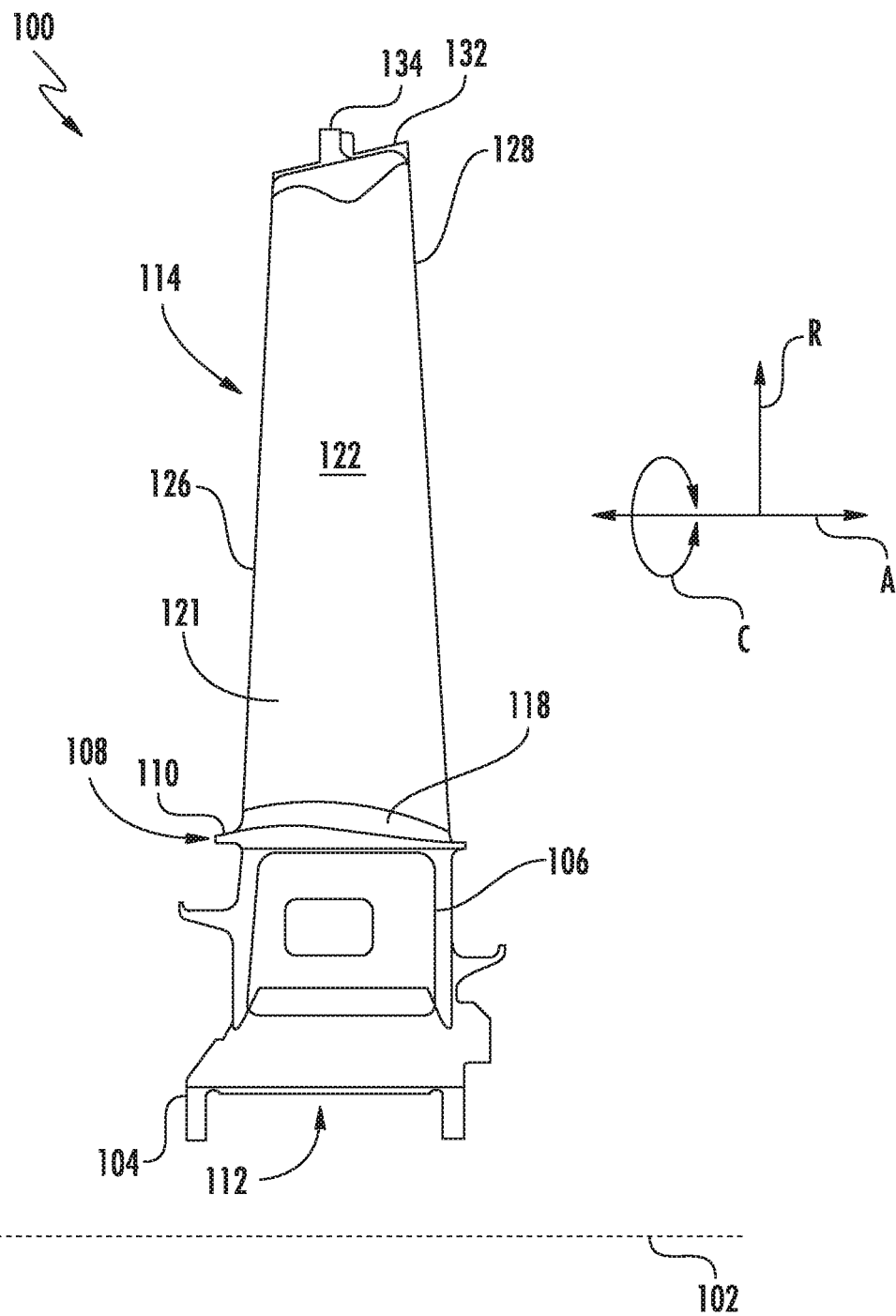
FIG. 2 is a front view of an exemplary rotor blade in accordance with the embodiments disclosed herein.

FIG. 2 is a view of an exemplary rotor blade 100, which may be incorporated into the turbine section 18 of the gas turbine engine 10 in place of one or more of the rotor blades 28. As shown, the rotor blade 100 defines an axial direction A, a radial direction R, and a circumferential direction C. In general, the axial direction A extends parallel to an axial centerline 102 of the shaft 24 (FIG. 1), the radial direction R extends generally orthogonal to the axial centerline 102, and the circumferential direction C extends generally concentrically around the axial centerline 102.

As illustrated in FIG. 2, the rotor blade 100 may include a dovetail 104, a shank portion 106, and a platform 108. More specifically, the dovetail 104 secures the rotor blade 100 to the rotor disk 26 (FIG. 1). The shank portion 106 couples to and extends radially outward from the dovetail 104. The platform 108 couples to and extends radially outward from the shank portion 106. The platform 108 includes a radially outer surface 110, which generally serves as a radially inward flow boundary for the combustion gases 34 flowing through the hot gas path 32 of the turbine section 18 (FIG. 1). The dovetail 104, shank portion 106, and/or platform 108 may define an intake port 112, which permits cooling air (e.g., bleed air from the compressor section 14) to enter the rotor blade 100. In the embodiment shown in FIG. 2, the dovetail 104 is an axial entry fir tree-type dovetail. Alternately, the dovetail 104 may be any suitable type of dovetail. In fact, the dovetail 104, shank portion 106, and/or platform 108 may have any suitable configurations.

Figure 3:
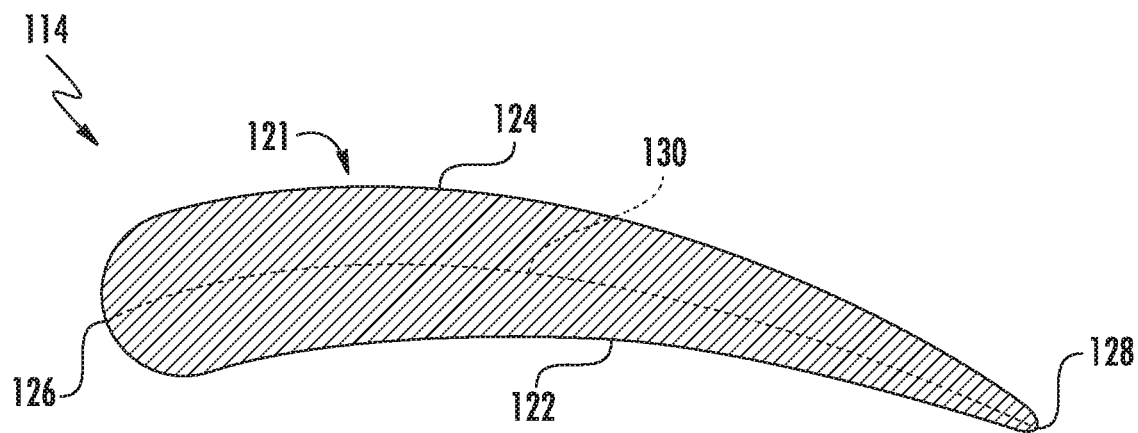
FIG. 3 is a cross-sectional view of an exemplary airfoil, illustrating a camber line in accordance with the embodiments disclosed herein.
Figure 5:
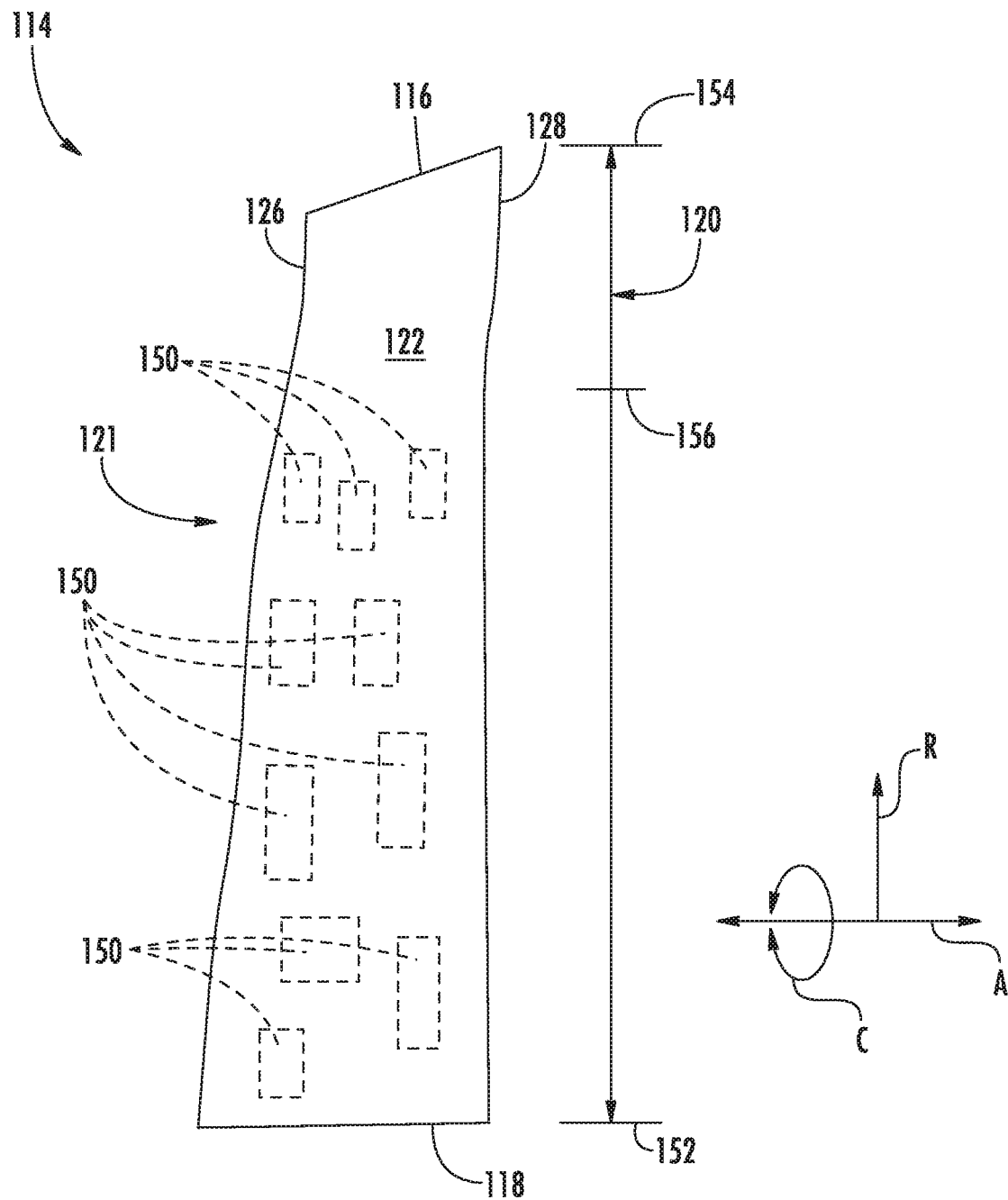
FIG. 5 is a front view of the airfoil shown in FIGS. 3 and 4, illustrating the radial positioning the plurality of pockets in accordance with the embodiments disclosed herein.

Referring now to FIGS. 2 and 3, the rotor blade 100 further includes an airfoil 114. In particular, the airfoil 114 extends radially outward from the radially outer surface 110 of the platform 108 to a tip 116 (FIG. 5). The airfoil 114 couples to the platform 108 at a root 118 (i.e., the intersection between the airfoil 114 and the platform 108). The airfoil 114 also includes an exterior surface 121, which includes a pressure side surface 122 and an opposing suction side surface 124 (FIG. 3). The pressure side surface 122 and the suction side surface 124 are joined together or interconnected at a leading edge 126 of the airfoil 114, which is oriented into the flow of combustion gases 34 (FIG. 1). The pressure side surface 122 and the suction side surface 124 are also joined together or interconnected at a trailing edge 128 of the airfoil 114 spaced downstream from the leading edge 126. The pressure side surface 122 and the suction side surface 124 are continuous about the leading edge 126 and the trailing edge 128. The pressure side surface 122 is generally concave, and the suction side surface 124 is generally convex.

Referring particularly to FIG. 3, the airfoil 114 defines a camber line 130. As shown, the camber line 130 extends from the leading edge 126 to the trailing edge 128. The camber line 130 also is positioned between and equidistant from the pressure side surface 122 and the suction side surface 124. The leading edge 126 is positioned at zero percent of the camber line 130, and the trailing edge 128 is positioned at one hundred percent of the camber line 130. Various other positions (e.g., twenty-five percent, fifty percent, seventy-five percent, etc.) along the camber line 130 may be defined as well.

In the embodiment shown in FIG. 2, the rotor blade 100 includes the tip shroud 132 coupled to the tip 116 of the airfoil 114. In this respect, the tip shroud 132 may generally define the radially outermost portion of the rotor blade 100. The tip shroud 132 reduces the amount of the combustion gases 34 (FIG. 1) that escape past the rotor blade 100. In certain embodiments, the tip shroud 132 may include a seal rail 134 extending radially outwardly therefrom. Alternate embodiments, however, may include more seal rails 134 (e.g., two seal rails 134, three seal rails 134, etc.) or no seal rails 134 at all. Furthermore, some embodiments of the rotor blade 100 may not include the tip shroud 132.

Figure 4:
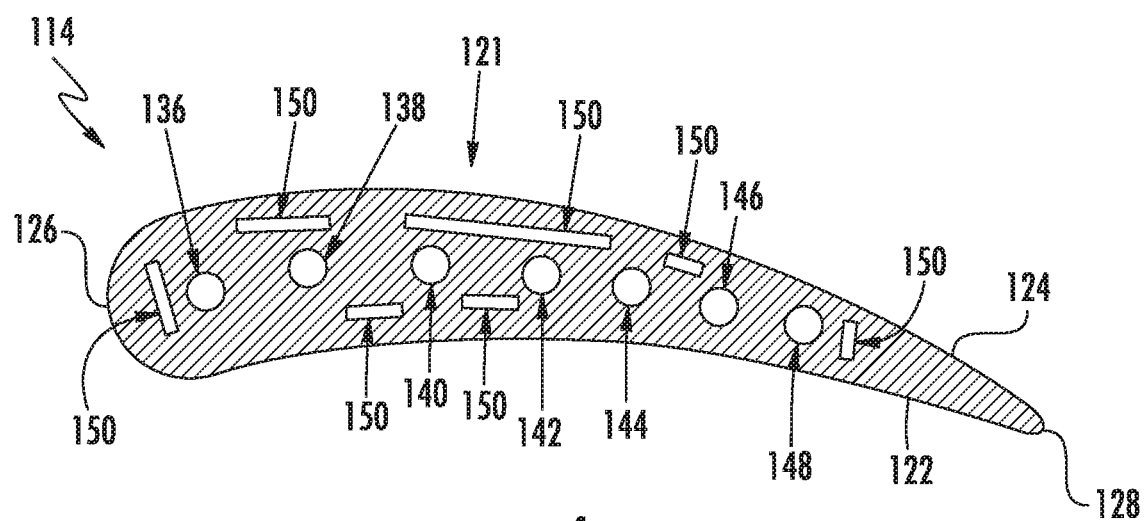
FIG. 4 is an alternate cross-sectional view of the rotor blade shown in FIG. 3, illustrating a plurality of cooling passages and a plurality of pockets in accordance with the embodiments disclosed herein.

Referring now to FIG. 4, the airfoil 114 may define one or more cooling passages extending therethrough. Other portions (e.g., the platform 108, the shank 106, etc.) of the rotor blade 100 may define portions of the cooling passages in certain embodiments. In the embodiment shown, the airfoil 114 defines seven cooling passages 136, 138, 140, 142, 144, 146, 148 positioned along the camber line 130. In particular, the cooling passages 136, 138, 140, 142, 144, 146, 148 are spaced apart along the camber line 130. In alternate embodiments, however, the airfoil 114 may define more or fewer cooling passages and the cooling passages may be positioned or arranged in any suitable manner. The cooling passages 136, 138, 140, 142, 144, 146, 148 are omitted from FIG. 3 for clarity. Similarly, the camber line 130 is omitted from FIG. 4 for clarity.

The cooling passages 136, 138, 140, 142, 144, 146, 148 provide cooling air to the airfoil 114 and the tip shroud 132 (if included). In this respect, the cooling passages 136, 138, 140, 142, 144, 146, 148 may extend from the intake port 112 radially outward to the tip 116. In some embodiments, one or more of the cooling passages 136, 138, 140, 142, 144, 146, 148 may be fluidly coupled to various cooling cavities or chambers (not shown) defined by the tip shroud 132. In operation, the cooling air, such as compressed air bled from the compressor section 14, may flow through the cooling passages 136, 138, 140, 142, 144, 146, 148. Specifically, the cooling air flows from the intake port 112 through the airfoil 114 to the tip 116 or the tip shroud 132 (if included), thereby providing cooling to the rotor blade 100.

The airfoil 114 also defines one or more pockets 150. In general, the pockets 150 may be hollow and thermally insulative. In the embodiment shown in FIG. 4, the airfoil 114 defines seven pockets 150. In alternate embodiments, the airfoil 114 may define more or fewer pockets 150 so long as the airfoil 114 defines at least one pocket 150. In general, the pockets 150 are separate from and fluidly isolated from each other.

Each pocket 150 acts as thermal impediment to reduce the amount of heat that some or all of the cooling passages 136, 138, 140, 142, 144, 146, 148 absorb from the hot gas path 32 (FIG. 1). More specifically, the pockets 150 are positioned between the cooling passages 136, 138, 140, 142, 144, 146, 148 and the exterior surface 121 of the airfoil 114 as shown in FIG. 4. That is, each pocket 150 is positioned between at least one of the cooling passages 136, 138, 140, 142, 144, 146, 148 and one or more of the pressure side surface 122, the suction side surface 124, the leading edge 126, and the trailing edge 128. The pockets 150 may be spaced apart from and fluidly isolated from the cooling passages 136, 138, 140, 142, 144, 146, 148 and/or the hot gas path 32. As such, the pockets 150 may be filled with stagnant air. The pockets 150 may also be purged or pressurized via one or more bleed holes defined by the rotor blade 100. During operation of the gas turbine engine (FIG. 1), heat from the combustion gases 34 (FIG. 1) flowing through the hot gas path 32 convectively transfers to the exterior surface 121 of the airfoil 114. This heat then conducts through the airfoil 114 toward the cooling passages 136, 138, 140, 142, 144, 146, 148. The pockets 150 and, more specifically, the stagnant air in the pockets 150 create a thermal resistance in the airfoil 114 to reduce the rate at which the heat conducts through the airfoil 114. In this respect, the pockets 150 provide a thermal impediment between the cooling passages 136, 138, 140, 142, 144, 146, 148 and the exterior surface 121 of the airfoil 114 to reduce the amount of heat absorbed by the cooling air.

FIG. 4 illustrates various positions in which the pockets 150 may be located. As mentioned above, the pockets 150 are positioned between the cooling passages 136, 138, 140, 142, 144, 146, 148 and the exterior hot surface 121 of the airfoil 114. In the embodiment shown in FIG. 4, the pockets 150 are positioned entirely between the cooling passages 136, 138, 140, 142, 144, 146, 148 and the exterior surface 121 of the airfoil 114. Although, in some embodiments, the pockets 150 may only be partially positioned between the cooling passages 136, 138, 140, 142, 144, 146, 148 and the exterior surface 121.

Furthermore, the pockets 150 may be positioned at various locations along the camber line 130. In some embodiments, for example, at least two of the pockets 150 may be spaced apart along the camber line 130. At least two of the pockets 150 may also be aligned along camber line 130. At least one of the pockets 150 may be positioned along the camber line 130 between an adjacent pair of the cooling passages 136, 138, 140, 142, 144, 146, 148. In the embodiment shown in FIG. 4, for example, one pocket 150 is positioned between each of the following pairs cooling passages: the cooling passages 138, 140; the cooling passages 140, 142; and the cooling passages 144, 146. In certain embodiments, each cooling passage of an adjacent pair of the cooling passages 136, 138, 140, 142, 144, 146, 148 may aligned along the camber line 130 with a portion of one of the pockets 150. For example, the adjacent cooling passages 140, 142 are aligned with portions of one of the pockets 150 in the embodiment shown in FIG. 4. In alternate embodiments, however, the one or more pockets 150 may positioned at any suitable location along the camber line 130.

Referring now to FIG. 5, the airfoil 114 defines a span 120 that extends from the root 118 of the airfoil 114 to the tip 116 of the airfoil 114. The root 118 is positioned at zero percent of the span 120, and the tip 116 is positioned at one hundred percent of the span 120. As shown, zero percent of the span 120 is identified by 152, and one hundred percent of the span 120 is identified by 154. Furthermore, seventy-five percent of the span 120 is identified by 156. Various other positions (e.g., twenty-five percent, fifty percent, etc.) along the span 120 may be defined as well.

FIG. 5 illustrates various positions along the span 120 in which the pockets 150 may be positioned. In some embodiments, for example, at least two of the pockets 150 may be spaced apart along the span 120. At least two of the pockets 150 may also be aligned along the span 120. Portions of at least two pockets 150 may also be partially aligned along the span 120. Furthermore, in certain embodiments, the airfoil 114 may be too thin between seventy-five percent 156 of the span 120 and one hundred percent 154 of the span 120 to define the pockets 150. In such embodiments, all of the pockets 150 defined by the airfoil 114 may be positioned between zero percent 152 of the span 120 and seventy-five percent 156 of the span 120. In alternate embodiments, however, the one or more pockets 150 may positioned at any suitable location along the span 120.

As mentioned above, the pockets 150 may be spaced apart along the span 120 and/or the camber line 130. In this respect, the pockets 150 are segregated and not continuous, thereby distributing the mechanical loads experienced by the rotor blade 100.

In the embodiments shown in FIGS. 4 and 5, the pockets 150 have a rectangular cross-section. Nevertheless, the pockets 150 may have a triangular cross-section, an elliptical cross-section, or any other suitable cross-section.

As discussed in greater detail above, the rotor blade 100 defines the one or more pockets 150, thereby creating a thermal impediment between the cooling passages 136, 138, 140, 142, 144, 146, 148 and the exterior surface 121. As such, the pockets 150 reduce the amount of heat that the cooling air flowing through some or all of the cooling passages 136, 138, 140, 142, 144, 146, 148 absorbs from the hot gas path 32. That is, the pockets 150 preserve the cooling capacity of cooling air, thereby providing improved thermal management of the rotor blade 100. In this respect, the cooling air flowing through some or all of the cooling passages 136, 138, 140, 142, 144, 146, 148 of the rotor blade 100 remains cooler than the cooling air flowing through the corresponding cooling passages of conventional rotor blades. Accordingly, the rotor blade 100 requires less cooling air than conventional rotor blades, thereby increasing the efficiency of the gas turbine engine 10.

The pockets 150 are described above in the context of the rotor blade 100. Nevertheless, the pockets 150 may also be incorporated into stationary hot gas path components, such as nozzles and shroud. In fact, the pockets 150 may be incorporated into any suitable turbomachine component.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A rotor blade for a turbomachine, comprising:
an airfoil defining a cooling passage extending between a root and a tip of the airfoil, the airfoil further defining a pocket positioned between the cooling passage and at least one of a pressure side surface of the airfoil or a suction side surface of the airfoil, the pocket spaced apart from the cooling passage and the at least one of the pressure side surface or the suction side surface by a portion of the airfoil, wherein the pocket is sealed off from fluid communication with the cooling passage and a hot gas path such that the pocket provides a thermal impediment between the cooling passage and the at least one of the pressure side surface or the suction side surface of the airfoil.

2. The rotor blade of claim 1, wherein the pocket is positioned entirely between the cooling passage and the at least one of the pressure side surface or the suction side surface.

3. The rotor blade of claim 1, wherein the airfoil comprises a leading edge and a trailing edge, the airfoil defining a camber line extending from the leading edge to the trailing edge and a plurality of cooling passages extending between the root and the tip.

4. The rotor blade of claim 3, wherein each passage of an adjacent pair of the plurality of passages is aligned along the camber line with a portion of the pocket.

5. The rotor blade of claim 3, wherein the pocket is positioned along the camber line between an adjacent pair of the plurality of passages.

6. The rotor blade of claim 1, wherein the airfoil comprises a leading edge and a trailing edge, the airfoil defining a camber line extending from the leading edge to the trailing edge, a span extending from the root to the tip, and a plurality of pockets positioned between the cooling passage and the at least one of the pressure side surface or the suction side surface.

7. The rotor blade of claim 6, wherein a first pocket of the plurality of pockets is spaced apart from a second pocket of the plurality of pockets along the camber line.

8. The rotor blade of claim 6, wherein a first pocket of the plurality of pockets is spaced apart from a second pocket of the plurality of pockets along the span.

9. The rotor blade of claim 1, wherein the airfoil defines a span extending from the root to the tip, the pocket being positioned between zero percent of the span and seventy-five percent of the span.

10. A turbomachine, comprising:
a turbine section including a plurality of rotor blades, each rotor blade comprising:
an airfoil defining a cooling passage extending between a root and a tip of the airfoil, the airfoil further defining a pocket positioned between the cooling passage and at least one of a pressure side surface of the airfoil or a suction side surface of the airfoil, the pocket spaced apart from the cooling passage and the at least one of the pressure side surface or the suction side surface by a portion of the airfoil, wherein the pocket is sealed off from fluid communication with the cooling passage and a hot gas path such that the pocket provides a thermal impediment between the cooling passage and the at least one of the pressure side surface or the suction side surface.

11. The turbomachine of claim 10, wherein the pocket is positioned entirely between the cooling passage and the at least one of the pressure side surface or the suction side surface.

12. The turbomachine of claim 10, wherein the airfoil comprises a leading edge and a trailing edge, the airfoil defining a camber line extending from the leading edge to the trailing edge and a plurality of cooling passages extending between the root and the tip.

13. The turbomachine of claim 12, wherein each passage of an adjacent pair of the plurality of passages is aligned along the camber line with a portion of the pocket.

14. The turbomachine of claim 12, wherein the pocket is positioned along the camber line between an adjacent pair of the plurality of passages.

15. The turbomachine of claim 10, wherein the airfoil comprises a leading edge and a trailing edge, the airfoil defining a camber line extending from the leading edge to the trailing edge, a span extending from the root to the tip, and a plurality of pockets positioned between the cooling passage and the at least one of the pressure side surface or the suction side surface.

16. The turbomachine of claim 15, wherein a first pocket of the plurality of pockets is spaced apart from a second pocket of the plurality of pockets along the camber line.

17. The turbomachine of claim 15, wherein a first pocket of the plurality of pockets is spaced apart from a second pocket of the plurality of pockets along the span.

18. The turbomachine of claim 10, wherein the airfoil defines a span extending from the root to the tip, the pocket being positioned between zero percent of the span and seventy-five percent of the span.

* * * * *